(12) United States Patent
Musser et al.

(10) Patent No.: US 10,706,467 B2
(45) Date of Patent: Jul. 7, 2020

(54) ALTERNATIVE FORM FACTOR FOR FINANCIAL INCLUSION

(71) Applicant: MasterCard International Incorporated, Purchase, NY (US)

(72) Inventors: Paul Michael Musser, Pilot Hill, CA (US); Sandeep Malhotra, Stamford, CT (US); David Colby Brown, Dardenne Prairie, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 946 days.

(21) Appl. No.: 15/286,044

(22) Filed: Oct. 5, 2016

(65) Prior Publication Data

US 2017/0098276 A1   Apr. 6, 2017

Related U.S. Application Data

(60) Provisional application No. 62/237,105, filed on Oct. 5, 2015.

(51) Int. Cl.
*G06Q 40/00*   (2012.01)
*G06Q 40/02*   (2012.01)
*G06Q 20/32*   (2012.01)
*G06Q 20/36*   (2012.01)
*G06F 13/40*   (2006.01)
*G06Q 20/10*   (2012.01)
*H04L 29/06*   (2006.01)

(52) U.S. Cl.
CPC ......... *G06Q 40/02* (2013.01); *G06F 13/4081* (2013.01); *G06Q 20/10* (2013.01); *G06Q 20/32* (2013.01); *G06Q 20/367* (2013.01); *H04L 63/0807* (2013.01)

(58) Field of Classification Search
CPC ........................................ G06Q 40/02
USPC ............................... 705/39, 42, 44
See application file for complete search history.

(56) References Cited

U.S. PATENT DOCUMENTS

| 10,510,057 | B2* | 12/2019 | Priebatsch | ......... G06Q 20/3672 |
| 2011/0099107 | A1* | 4/2011 | Saxena | ................ G06Q 20/108 |
| | | | | 705/42 |
| 2012/0143707 | A1 | 6/2012 | Jain | |
| 2014/0279546 | A1* | 9/2014 | Poole | ................... H04B 5/0031 |
| | | | | 705/44 |
| 2019/0057373 | A1* | 2/2019 | Van Veelen | ............ G06Q 20/00 |

FOREIGN PATENT DOCUMENTS

WO    2013/051029 A1    4/2013

OTHER PUBLICATIONS

"PCT Notification of Transmittal of the International Search Report and the Written Opinion" International Searching Authority, dated Jan. 16, 2017 (dated Jan. 16, 2017), for International Application No. PCT/US2016/055522, 10pgs.

* cited by examiner

*Primary Examiner* — Samica L Norman
(74) *Attorney, Agent, or Firm* — Buckley, Maschoff & Talwalkar LLC

(57) ABSTRACT

According to some embodiments, apparatus and methods are provided comprising a connector attachment including a housing, wherein the connector attachment is selectively connectable to a mobile device; and a first token stored within the connector attachment, wherein the first token is operative to execute a transaction with a second token. Numerous other aspects are provided.

20 Claims, 6 Drawing Sheets

ALTERNATIVE FORM FACTOR FOR FINANCIAL INCLUSION

CROSS REFERENCE TO RELATED APPLICATION

The present application claims the benefit of U.S. Provisional Patent Application Ser. No. 62/237,105, filed Oct. 5, 2015, and entitled "Alternative Form Factor For Financial Inclusion", the contents of which are hereby incorporated by reference for all purposes.

BACKGROUND

The use of credit card, debit cards, stored values cards, and other means of payment relying on payment account numbers (PANs), as opposed to cash, is ever-increasing among consumers. However, a large portion of the adult population still relies on cash, and may pay almost exclusively in cash at micro/small merchants or at larger merchants, especially in developing countries. These consumers may have unsteady income that may come in tranches (e.g., receiving pay following harvests), and may make dozens of small transactions weekly. These people may be both consumers and merchants, mixing their resources. While these consumers are often not associated with a formal banking institution ("unbanked"), they may participate in informal borrowing and saving. As these consumers are unbanked, they may spend an extraordinary amount of time tracking their funds and "making ends meet."

The unbanked consumers may live in rural communities and on the outskirts of a major city; they may have a mobile account. While the unbanked consumers may use the mobile account, use of mobile accounts is low and may mainly consist of person to person (P2P) transactions (e.g., they use it only for sending funds to people). Additionally, the unbanked consumers may experience unreliable telecommunications and power every day.

The present inventors have now realized that it may be desirable to provide efficient monetary transaction delivery, storage and tracking to the unbanked.

DETAILED DESCRIPTION

Figure 1A:
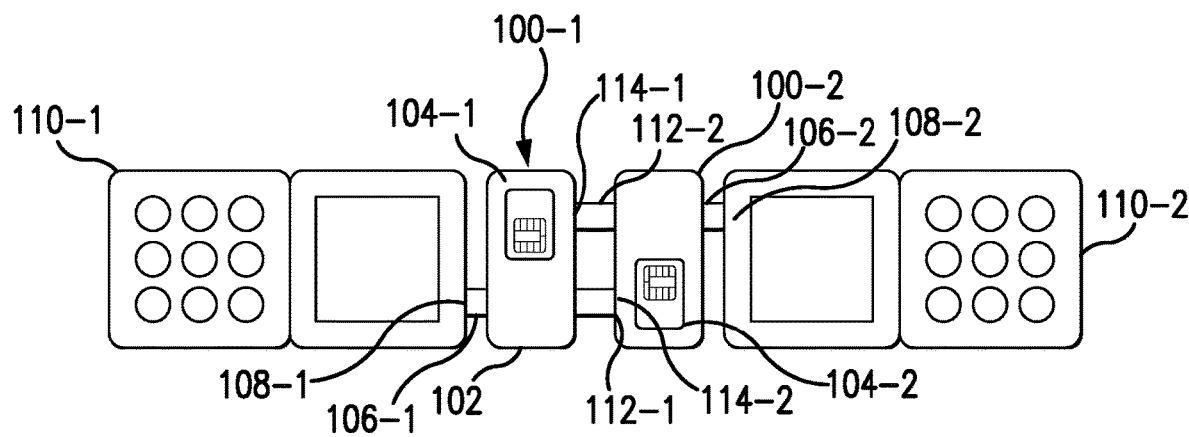
FIGS. 1A-1D illustrate a device according to some embodiments.

Despite the increasing use among consumers of credit cards, debit cards, stored values cards, and other means of payment, a large portion of the adult population still relies on cash, and may pay almost exclusively in cash at micro/small merchants or at larger merchants, especially in developing countries. These consumers may have unsteady income that may come in tranches (e.g., receiving pay following harvests), and may make dozens of small transactions weekly. These people may be both consumers and merchants, mixing their resources. While these consumers are often not associated with a formal banking institution ("unbanked"), they may participate in informal borrowing and saving. Unbanked consumers may spend an extraordinary amount of time tracking their funds and "making ends meet."

Traditional debit and credit cards may not meet the needs of unbanked consumers, payers and the ecosystem in which they operate.

Although not provided by traditional debit and credit cards, embodiments of the present disclosure may:
  ensure an originator of a transaction may have absolute confidence that their funds may not move without their permission, and that the intended recipient has received those funds;
  ensure that funds moving in a transaction are "good funds" (e.g., funds represent funds on deposit and are not potentially exposed to other calls or limitations);
  ensure both the originator of the transaction and the recipient of the funds may be confident that upon the completion of the transaction, no reversal of the transaction is permitted;
  provide for anyone to be a merchant immediately with no risk management documentation;
  have no need for a bank or other fiduciary to assume acquiring risk; as funds may be exchanged in near-to-actual real time, there may be no reversal of transaction and all funds may be good funds;
  have no need for issuers (e.g., in a historical context of a fiduciary that takes on the risk of enabling an individual with a purchase device, often associated to a broader account relationship with the fiduciary) as the individual may only be able to use good funds in near/real time and without repudiation;
  provide for a buyer of goods and services to also be a seller of goods and services on another occasion (e.g., no additional documentation is needed to occupy both roles);
  include a pricing model that may support nearly exclusive small value payments and frequent non-payment transactions; and
  provide a business model that may be flexible and may not be predefined in its participation, including potentially single and multi-party ownership of network and contribution of revenue (e.g., banks, Mobile Network Operator (MNO), Non-Governmental Organizations (NGOs)s, governments, consumer goods manufacturers/distributors, etc.).

One or more embodiments may provide a financial inclusion system and method to provide an accounting record of all monetary transactions, as well as to facilitate the transactions via a wallet module. One or more embodiments may provide an account that may be accessed with a mobile token, for example. The token may use chip technology that works off-line without requiring a mobile or internet connection. As used herein, the terms "token" and "mobile token" may be used interchangeably, unless otherwise indicated.

In some embodiments, the financial inclusion system and method may allow transactions without the traditional four-party model of a consumer, an issuer, a merchant and an acquirer, and instead may include simply the merchant, the user/consumer and a central fiduciary. Further, in some embodiments, a token-holder/user may be a merchant.

As a non-exhaustive example of some embodiments, a user may have an enabled token (e.g., stored on a dongle form factor or external/internal connector attachment) upon which they load $25 using the financial inclusion system and method described herein in embodiments or through any other suitable method. In one or more embodiments, the token may be enabled after the user enrolls the dongle form factor. In one or more embodiments, the "dongle form factor" may be explicitly turned on or off by an application on a mobile device or operating system, for example. As used herein, the terms "dongle form factor," and "connector attachment," may be used interchangeably, unless otherwise indicated. The connector attachment may connect to an electronic device via at least one of an audio jack, a charge port, as part of the electronic device circuitry, or wirelessly via a communication method such as Bluetooth, WiFi, GPRS data, etc. With this enabled token stored on the connector attachment, the user may then engage in at least one operation. For example, in one or more embodiments, the user may operate the enabled token to at least one of: make a purchase in another store; transfer at least some of the loaded funds to a second user (e.g., his sister) token across the country; transfer at least some of the loaded funds to his utility holder's token/account to pay his bill; and receive a funds transfer from a second user's token. In one or more embodiments, the operations may be recorded by the enabled tokens, and the funds may be transferred in real-time, such that there is instantaneous good funds for the transaction. One or more embodiments enable small, frequent digital transactions in a cash-like environment, guaranteeing good funds at all times.

In one or more embodiments, if a transaction occurs while there is no internet connectivity (e.g., off-line), once the enabled token is connected, the balance on the account ledgers may be updated and the user may have access to his/her transaction receipts. In one or more embodiments, if a transaction occurs while there is no connectivity (e.g., off-line), the transaction may be completed with funds on the enabled token, which may be akin to transacting in "cash." In one or more embodiments, the enabled token may also be capable of providing the real time balance to the token holder either on a display panel of the token or via a display of a mobile device, or via any other suitable display. In one or more embodiments, a record of a transaction for cash, may be stored in the system 500.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

Figure 2:
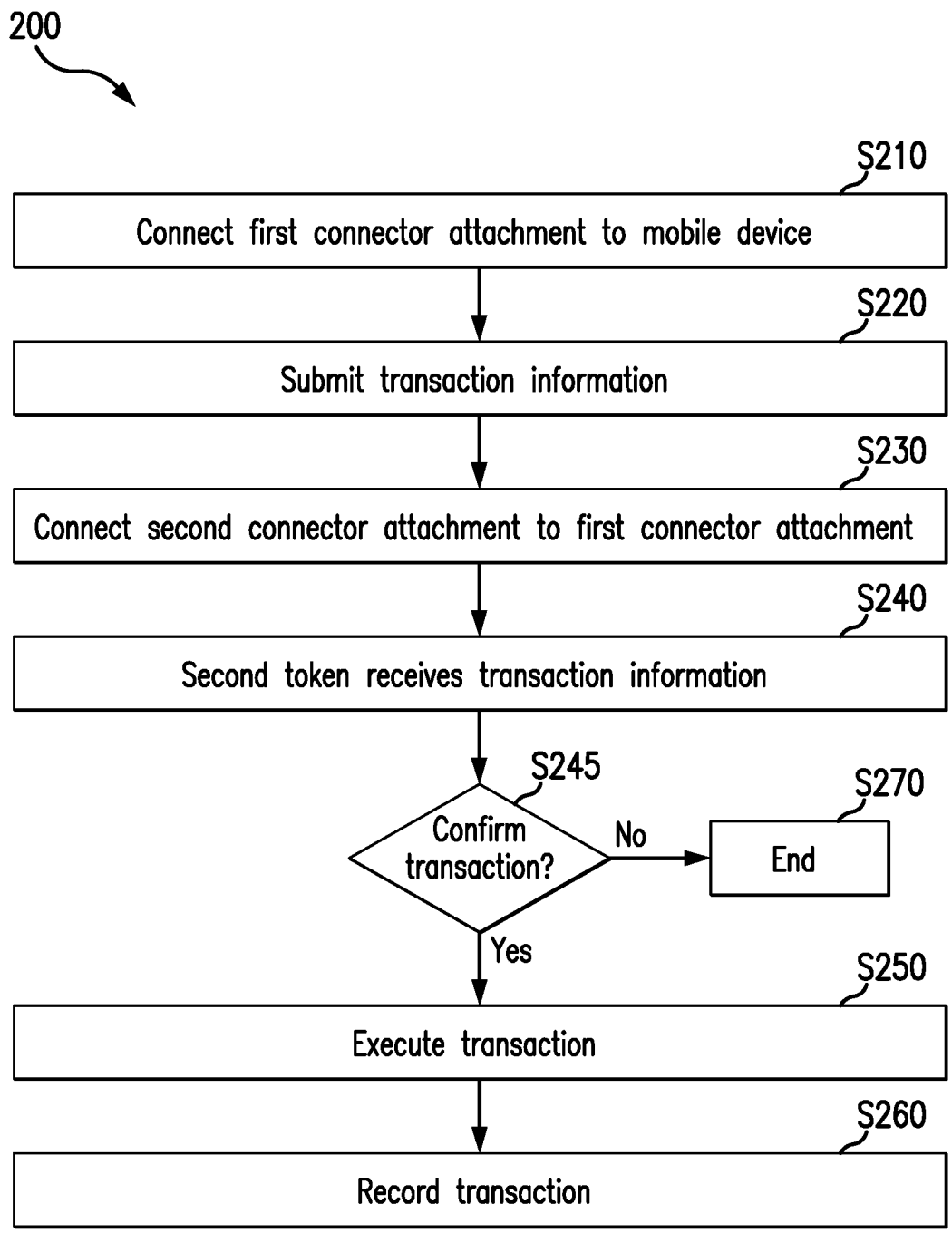
FIG. 2 is a flow diagram illustrating a process that may be performed in accordance with aspects of some embodiments herein.

One or more embodiments of the invention or elements thereof can be implemented in the form of a computer program product including a computer readable storage medium with computer usable program code for performing the method steps indicated. In one or more embodiments, the system 500 may be condition to perform the process 200 (FIG. 2), such that a processor 505 (FIG. 5) of the system 500 is a special purpose element configured to perform operations not performable by a general purpose computer or device. The flow charts described herein do not imply a fixed order to the steps and embodiments of the present invention may be practiced in any order that is practicable.

All processes mentioned herein may be performed using any suitable combination of hardware (e.g., circuit(s)), software or manual means. For example, a computer-readable storage medium may store thereon instructions that when executed by a machine result in performance according to any of the embodiments described herein. Software embodying these processes may be stored by any of non-transitory computer-readable media, such as a hard drive, a floppy disk, a CD-ROM, a DVD-ROM, a Flash drive, Flash memory, a magnetic tape, and solid state Random Access Memory (RAM) or Read Only Memory (ROM) storage units, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software. Examples of these processes will be described below with respect to embodiments of the system, but embodiments are not limited thereto.

Turning to FIGS. 1A-D and 2, a connector attachment 100 for use with a financial inclusion system and other systems and an example of operation 200 (FIG. 2) according to some embodiments is provided. In one or more embodiments, the connector attachment 100 may be selectively connectable to a mobile device 110.

In one or more embodiments, the connector attachment 100 may include a housing 102 and an integrated chip or token 104 stored or embedded therein. The connector attachment 100 may be made from a silicon based microchip. Other suitable materials may be used. As used herein, a dongle form factor ("dongle") or connector attachment may be a small piece of hardware that attaches to an electronic device in order to provide additional functions that may only be available when the connector attachment is connected to the electronic device. As used herein, a "mobile token" or "token" is a device that communicates using an out-of-band channel to demonstrate participation in the financial inclusion system electronically. In one or more embodiments, enrollment for token-use may be immediate and may not require a banking relationship. For example, the account may be opened and used with enablement of the token.

In one or more embodiments, the connector attachment 100 may be connected to the mobile device 110. In some embodiments, the housing 102 may include at least one mobile plug 106 that may be received in a port 108 of the mobile device 110. The mobile device 110 may be a cellular phone, smart device or tablet. Other suitable mobile devices may be used.

While the examples provided herein describe connecting the connector attachment 100 to a mobile device, in some embodiments, the connector attachment 100 may be connected to a PC in the same manner described below with respect to the mobile devices.

In some embodiments, the housing 102 may include at least one connector attachment plug 112 and at least one connector attachment jack or port 114 that may provide for coupling of a first connector attachment 100-1 to a second connector attachment 100-2. In one or more embodiments, the attachment jack 114 may be an electrical device consisting of a connector socket designed for insertion of a plug of the second connector attachment 100-2.

In one or more embodiments, funds may be stored on the "token," which may, for example, be a financial inclusion chip or any other suitable chip housed in the connector attachment 100. In one or more embodiments, the movement of funds may be in real-time (e.g., form an offline token stored in the connector attachment to another offline token). In one or more embodiments, the use of the connector attachment 100 may eliminate the need for a token card and another device to receive the card.

Some embodiments may provide for token balance inquiries, PIN entry and other account management checks (such as last transaction detail, transaction summary, etc.) to be made via an application on the connector attachment itself. In some embodiments, a display panel 304 (FIG. 3) or a speaker, for example, may provide the balance, account management checks and an area for PIN entry.

In one or more embodiments, the secure microchip (i.e., token) of the connector attachment may store offline account balance information and details associated with at least one transaction.

In one or more embodiments, the financial inclusion server may house a shadow account (e.g., 404 in FIG. 4) representing the offline account securely stored on the token of the connector attachment. When the connector attachment is online, the shadow account may be synched with offline account details, whereby the balance in the shadow account may be updated by the offline account balance and the details of at least one transaction stored on the secure token of the connector attachment.

Figure 1B:
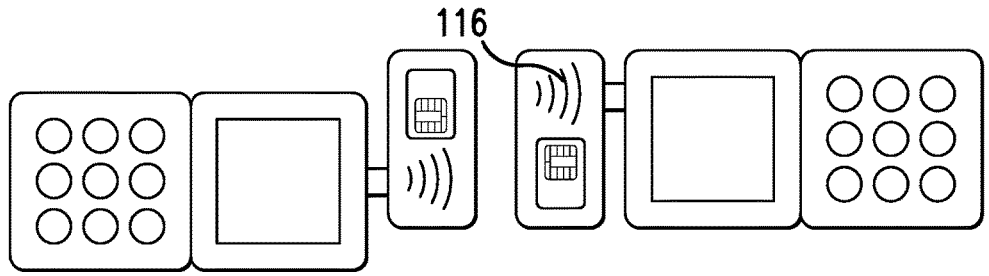

In one example of operation 200 (FIG. 2) according to some embodiments, a first connector attachment 100-1 is connected to a first user's mobile device 110-1 in S210. As used herein, the terms "customer," "client," and "merchant" may be collectively referred to as a "user," unless otherwise indicated. In one or more embodiments, connection of the connector attachment 100 and the user's mobile device 110 may be via receipt of the mobile plug 106 in the port 108 of the mobile device 110 (FIGS. 1A and 1B). In one or more embodiments, connection of the connector attachment 100 and the user's mobile device 110 may be via other suitable physical attachment.

Figure 1C:
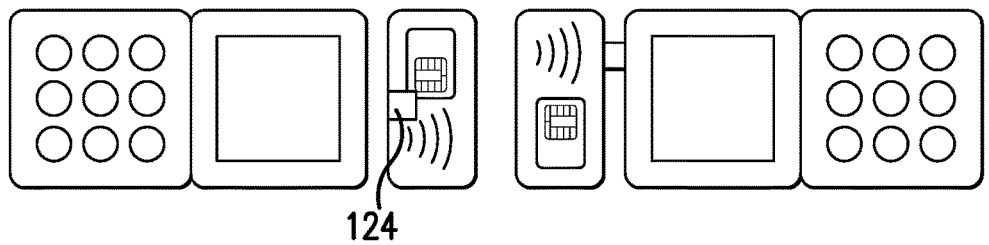
Figure 1D:
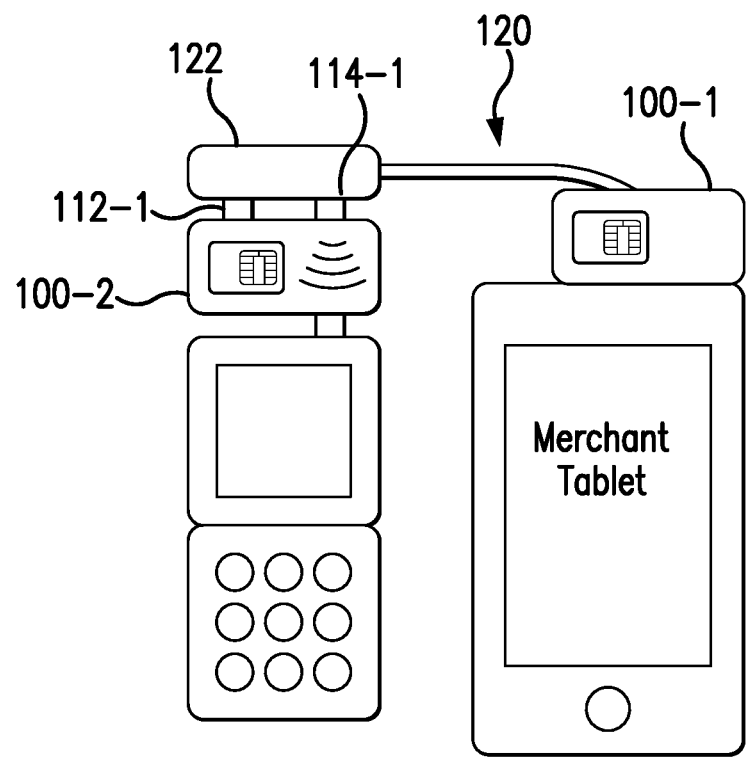

In one or more embodiments, the connector attachment 100 may connect to the mobile device 110 without physical contact (e.g., may be accomplished via a direct wireless communication 116 such as, for example, NFC (near field communication), Bluetooth, Bluetooth LE, RF (radio frequency) communication protocols and audio frequency communication protocols) (FIG. 1C). Other suitable wireless communication protocols may be used.

In one or more embodiments, the token 104, when connected to the mobile device, may be directly loaded and unloaded via a message or call to the financial inclusion server (or other suitable server) (e.g., processor 408 in FIG. 4) via the mobile device 110.

In one or more embodiments, a user may load value onto the offline account securely stored on the token 104 of the connector attachment 100. In one or more embodiments, the secure environment on the token 104 may be encrypted via complex cryptography algorithms (e.g., the cryptography algorithms used on EMV-based microchips that are known in the art) and may not be tampered with.

In one or more embodiments, funds may be loaded onto the token 104 via manipulation of the mobile device 110 (e.g., a user may scroll through a standard feature screen of the mobile device and request a load). In one or more embodiments, the mobile device 110 may then dial a central switch that may recognize at least one of the mobile device (e.g., recognize the phone number), the token chip number, and other suitable handset fingerprints. In one or more embodiments, the user may enter information (e.g., a PIN) into the mobile device for authentication. After authentication of the user is confirmed, the user may use the keyboard on the mobile device to enter an amount of funds to transfer from an online home/master account with a financial inclu-sion processor 408 (FIG. 4) to the token 104 stored on the connector attachment 100. The funds may be transferred in real-time to the token 104 stored on the connector attachment 100.

In one or more embodiments, a merchant or second user may have a token stored in a connector attachment and a mobile device, and funds may be moved in real-time between the second user's token and the first user's token.

Returning to FIG. 2, in S220, the first user submits transaction information to the first token 104-1 via a keyboard (not shown) of the first mobile device 110-1. For example, the first user may enter a transaction amount, a recipient identification, and authentication information (e.g., PIN, password, biometrics, etc.). In one or more embodiments, the first user may also enter a purpose of the transaction. In one or more embodiments, a user may use the token at least for retail payments, storing value, cash in/cash out (CICO) services, transactional receipts (on cash and digital transactions), as an interoperable connection to other payment providers and accounts, and as a connection to non-bank payers/payees such as government and NGOs.

Then in S230, a second user, who has a second connector attachment 100-2 with a token 104-2 connected to their mobile device 110-2, in the same manner as described above with respect to the first user in S210, connects the second connector attachment 100-2 to the first connector attachment 100-1. While the above describes the first user submitting the transaction information in S220, and then the second user connecting their second connector attachment to the first connector attachment in S230, in some embodiments, S220 and S230 may be reversed such that the second user connects their second connector attachment to the first connector attachment and then the first user submits the transaction information. In some embodiments the first and second connector attachments 100-1 and 100-2 may be connected whereby the first connector attachment plug 112-1 is received in the second connector attachment port 114-2 and the second connector attachment plug 112-2 is received in the first connector attachment port 114-1 (FIG. 1A).

It is noted that the manner in which the first connector attachment 100-1 is connected to the first mobile device 110-1 may be the same or different from the manner in which the second connector attachment 100-2 is connected to the second mobile device 110-2. For example, the first connector attachment 100-1 may be connected to the first mobile device 110-1 via the audio plug or charge plug 106-1 received in the port 108-1 of the mobile device 110-1, while the second connector attachment 100-2 may be connected to the second mobile device 110-2 without physical contact (FIG. 1C).

In some embodiments, the connector attachment 100 may include an extended connector 120 (FIG. 1D) to make access between connector attachments easier at check-out counters, for example. The extended connector 120 may be one of selectively coupled to the first connector attachment 100-1 or integrally formed with the first connector attachment 100-1. The extended connector 120 may have a free end 122 to connect to the second connector attachment 100-2. In one or more embodiments, the free end 122 may include the first connector attachment plug 112-1 and the first connector attachment jack/port 114-1 for connection to the second connector attachment 100-2.

In some embodiments, the first and second connector attachments 100-1 and 100-2 may be selectively coupled to at least one of each other, and their respective mobile device 110, without physical contact (e.g., may be accomplished via a direct wireless communication 116 such as, for example, NFC (near field communication), Bluetooth, Bluetooth LE, RF (radio frequency) communication protocols and audio frequency communication protocols (FIGS. 1B and 1C).

Turning back to operation 200, in S240, in one or more embodiments, the second token 104-2 receives the transaction information from the connected first token 104-1. Then in S245, it is determined if the second user confirms the transaction information. If the second user confirms the transaction information in S245 via the second mobile device 110-2, for example, the transaction is executed in S250 between the first token 104-1 and the second token 104-2. In one or more embodiments, execution of the transaction may be settled immediately and include the transfer of the funds in real-time, such that there may be instantaneous good funds (e.g., no credit extension is provided).

In some embodiments, the transaction may be executed by the connection of the first connector attachment 100-1 to the second connector attachment 100-2, without a confirmation step S245.

In one or more embodiments, receipts may be generated for all transactions (e.g., both paper and electronic transactions). The executed transaction is recorded by each of the tokens 104-1 and 104-2 in S260. If the second user does not confirm the transaction information via the second mobile device 110-2 in S245, the process ends at S270. In one or more embodiments, the second user may intentionally not confirm the transaction, or a pre-defined amount of time may pass without confirmation of the transaction, which may also result in not confirming the transaction, whereby the process then ends at S270.

In some embodiments, the first connector attachment 100-1 and second connector attachment 100-2 may be connected to each other via a mobile application, for example. As used herein a mobile application may be a computer program designed to run on smartphones, tablet computers and other mobile devices. In one or more embodiments, the connector attachment 100 may also use the mobile application to connect to another account associated with the token, which may only be accessible when the connector attachment 100 is connected to a central server at a processor (e.g., financial inclusion processor 505) via a network, for example. In one or more embodiments, the user may use the mobile application to transfer funds from the other account to the token 104 and vice versa. In one or more embodiments, the connector attachment 100 and token 104 may operate regardless of utility status (electricity or telecommunications). For example, they may receive power from the mobile device 110 when physically connected thereto via the mobile plug 106 (FIGS. 1A and 1B). In one or more embodiments, the connector attachment 100 may include a power source 124 (e.g., battery that may or may not be recharged) to provide power to the connector attachment 100 and token 104 when the connector attachment 100 is not physically connected to the mobile device (FIG. 1C). In terms of telecommunications, for example, in one or more embodiments, if a transaction occurs while there is no connectivity (e.g., off-line), once the token 104 is connected (online) via the connector attachment 100, the balance on the account ledgers may be updated and the user may have access to his/her transaction receipts. In one or more embodiments, the receipts may empower users to track their spending and transactions.

In one or more embodiments, the connector attachment 100 may include any of an antenna, a speaker and microphone to facilitate transactions.

One or more embodiments may provide for all transactions to occur in a Processor-On Us Environment (e.g., a pre-paid processor that is closed loop and houses the ledger accounts for all users on one platform). The fiduciary bank may house the funds reflected on the ledger accounts on the financial inclusion platform (or other suitable platform), as further described below). Conventionally, four-party business models are typically "processor off us" in that the processor of the merchant/acquirer may not also be the processor of the consumer/issuer. The three-party models may typically be processor-on-us with the network owner acting as both the acquirer/processor for the seller/merchant and the issuer/processor for the consumer. One or more embodiments may eliminate acquiring and delegate issuing to simple fiduciary roles, not necessarily requiring a bank to actually distribute the token;

One or more embodiments may enable lower cost service delivery (access). For example, reducing the number of parties involved to complete the transaction may enable a lower cost service delivery. Also, reducing the number of parties involved with the transaction may reduce the risks associated with the transaction, also reducing the cost of service delivery.

Figure 3:
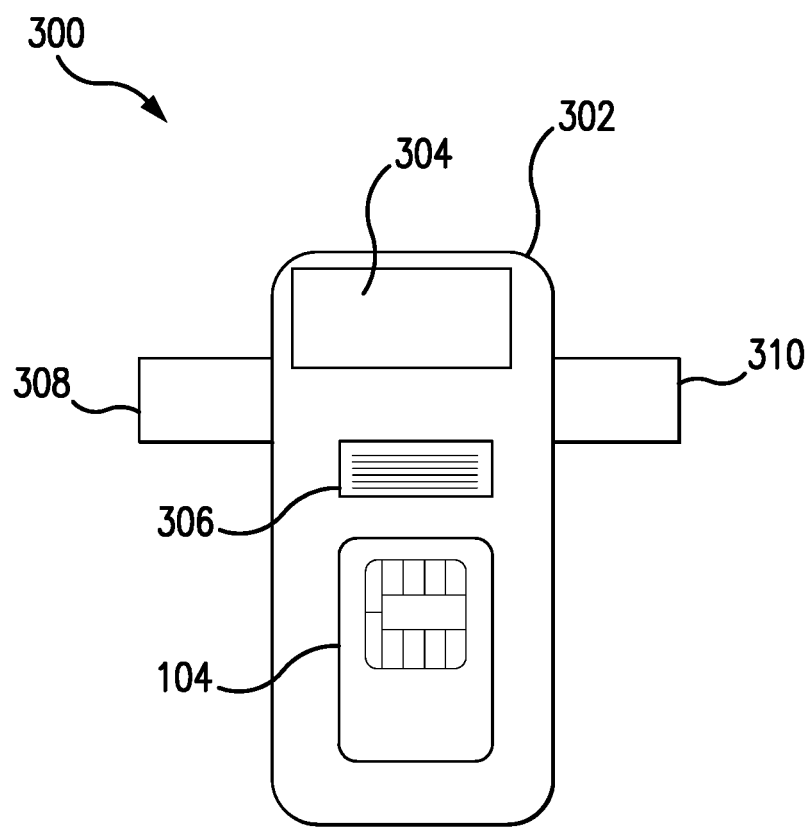
FIG. 3 illustrates a device according to some embodiments.

Turning to FIG. 3, another exemplary embodiment of a connector attachment 300 is provided. In one or more embodiments, the connector attachment 300 may include a housing 302, a display panel 304 on an exterior of the housing 302 and a keypad 306 on one of the display panel 304 and the exterior housing 302. As described above for connector 100, with respect to FIGS. 1A-D and 2, the connector attachment 300 may also include a connector attachment plug 308 and a connector attachment port 310 for physical connection to another connector attachment. In one or more embodiments the connector attachment 300 may wirelessly connect to another connector attachment, as described above. In this manner, the connector attachment 300 may execute transactions without connection to a mobile device.

While the exemplary embodiments provided herein describe funds being stored on the token, in one or more embodiments, the funds may be digital units or another virtual currency. For example, when an emergency exists, a government may provide food units or supply rations to a user on the connector attachment that the user may then redeem for food or other supplies.

Figure 4:
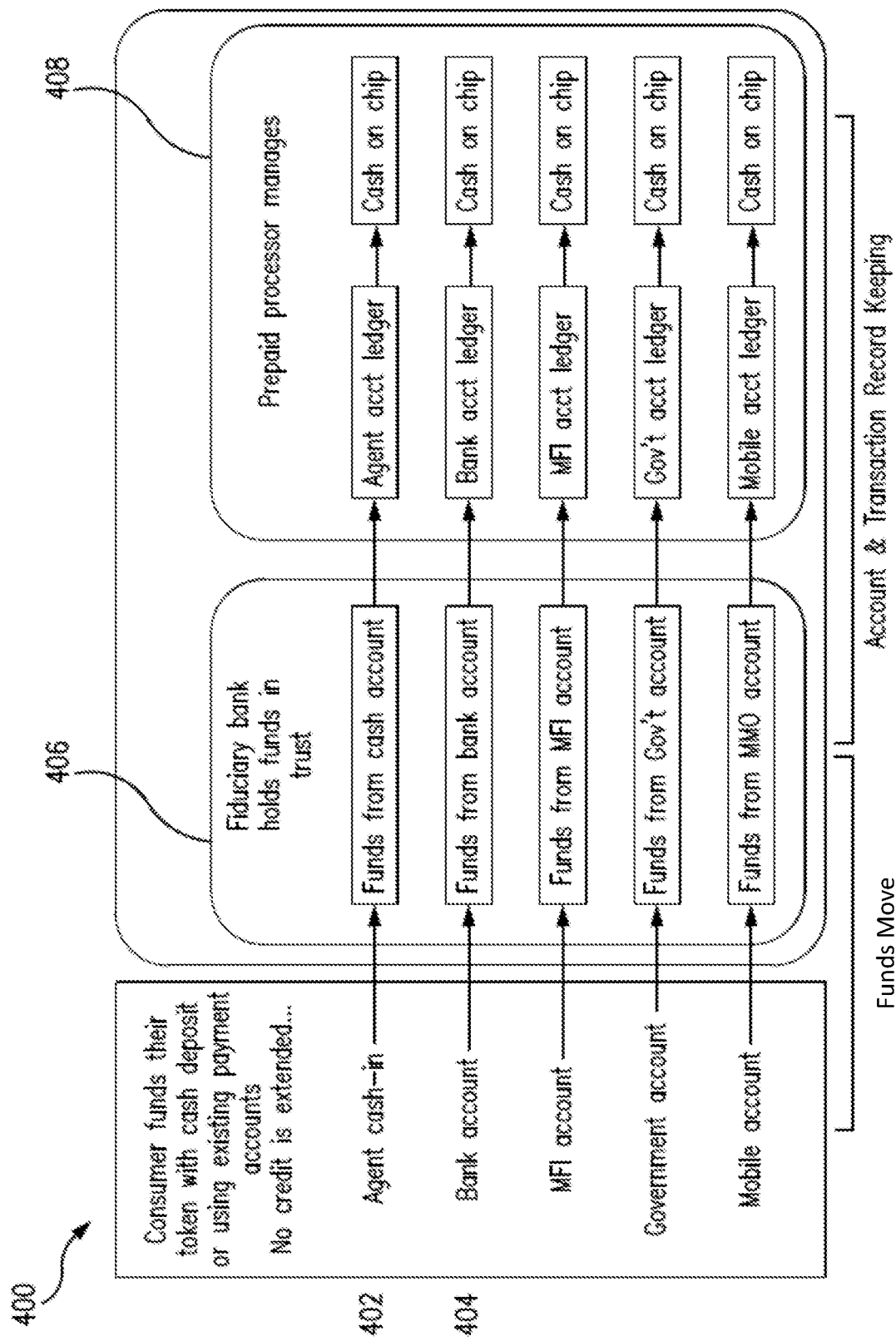
FIG. 4 is a schematic block diagram representation of a system, in accordance with some aspects of some embodiments herein.

FIG. 4 is a block diagram of a system 400 that includes illustrative devices that may be utilized for funding the token 104. In some embodiments, the system 400 may be used to implement aspects of process 200. System 400 shows one or more existing cash 402 or payment accounts 404. In one or more embodiments, the consumer funds their token 104 with cash deposits 402 or existing payment accounts 404 (e.g., bank account, Mobile Financial Institution account, government account, mobile account), such that no credit is extended with the system. In one or more embodiments, to allow the funds to be accessed from the token 104, the funds from the cash account 402 or payment account 404 may first be moved into a fiduciary bank 406, for example, which may hold the funds in trust. Then, a processor 408 (e.g., Mastercard®, the assignee of the present disclosure) that is providing the token 104 may manage the accounts, and may be responsible for transaction record keeping (e.g., operation of an electronic wallet module, as is known in the art). For example, in one or more embodiments, the user may contact the processor 408 (via a mobile device or the connector attachment, as described above) to move funds from a cash account and a bank account to the token 104 such that the funds are available irrespective of the connectivity status. As used herein, the term "funds" may be equivalent to the term "money," in any suitable denomination. The processor 408 may keep a record of these transactions.

In one or more embodiments, deposited funds may be moved to the fiduciary 406. The user may then retain those funds at the fiduciary ("cloud" balance) or further transfer it to the token 104 (electronic cash). In one or more embodiments, transactions executed in a disconnected environment may only be executed with electronic cash loaded on the token 104. In some embodiments, funds may be loaded directly to the token 104 at a load agent, or transferred from a P2P transfer from another user's token 104. For example, funds may have been transferred to the token 104 after a transaction, and instead of leaving the funds on the token 104, the user may transfer the funds to one of their other accounts. In one or more embodiments, the cash on the token 104 may be fiat currency such that if the connector attachment 100 is lost or otherwise compromised, the cash on the token 104 may also lost or compromised. However, if the connector attachment 100 is found by someone else, the cash may be used depending on whether an identity authentication (e.g., personal identification number) element has been implemented and passed, otherwise the cash on the token may not be accessed.

In one or more embodiments, while there may be no repudiation or chargebacks, there may be administrative reversals. For example, a user and merchant may not request a reversal based upon faulty service or goods not as advertised. However, if the financial inclusion processor 408 makes an error and credit/debits parties inaccurately, a reversal of that credit/debit may then be facilitated.

In the instance of the user/account holder interacting with the financial inclusion processor 408 in an effort to, for example, update or change their account information, communication and exchanges of information may be transmitted via a communication network (not shown). In some embodiments, the communication network may be a public network such as the Internet, while in other embodiments at least portions of the communication network may include a private network.

Figure 5:
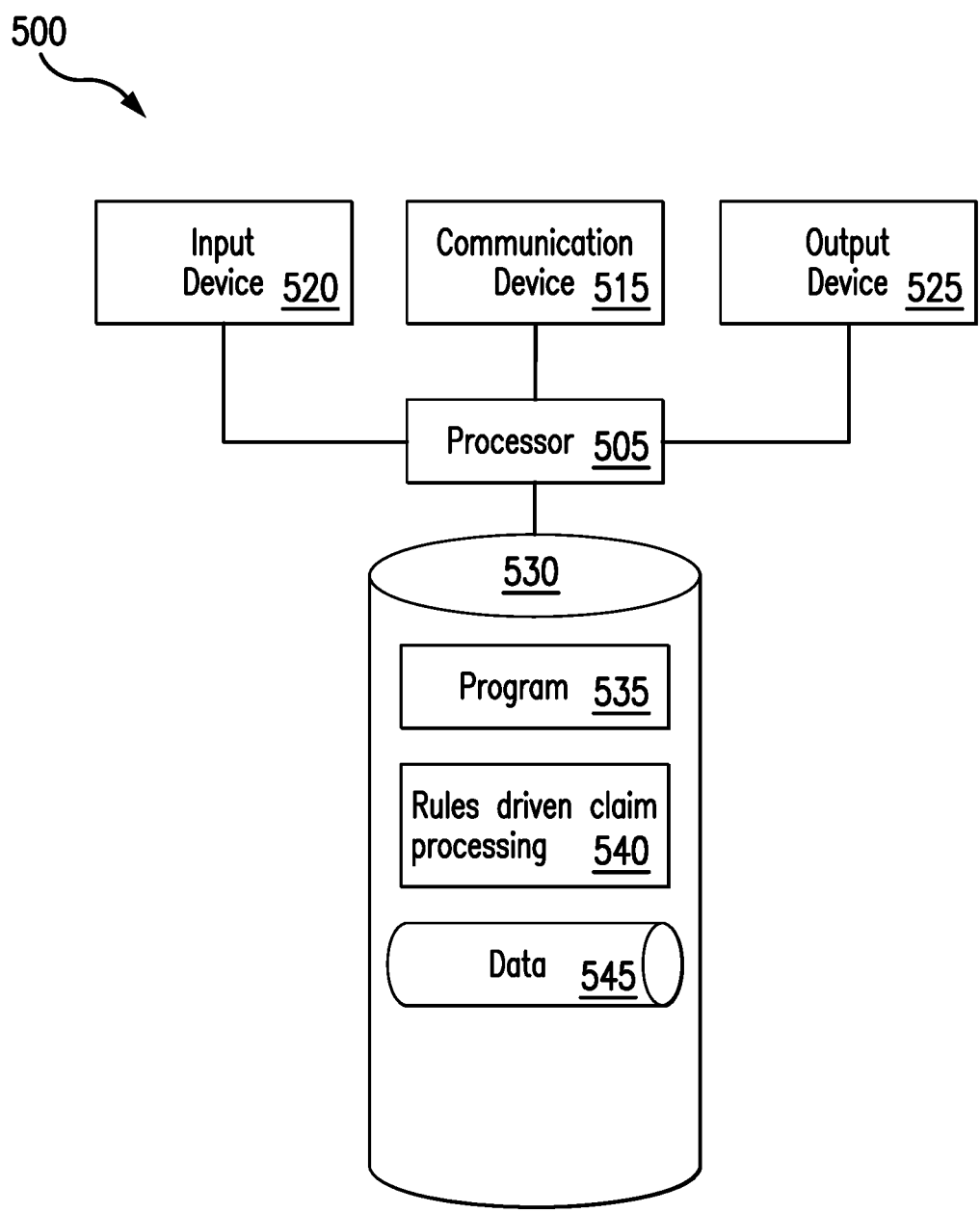
FIG. 5 is a block diagram of a processing tool or platform according to some embodiments.

FIG. 5 is a block diagram overview of a financial inclusion connector system, apparatus or platform 500 according to some embodiments. System 500 may be, for example, associated with any of the processes described herein, including for example a device or system to implement aspects of process 200. System 500 may include an application server supporting a financial inclusion process. System 500 comprises a financial inclusion processor 505, such as one or more commercially available Central Processing Units (CPUs) in the form of one-chip microprocessors or a multi-core processor, coupled to a communication device 515 configured to communicate via a communication network to another device or system, or with one or more users. In the instance system 500 comprises an application server, communication device 515 may provide a means for system 500 to interface with a client device (e.g., a merchant device/token). The system 500 further includes an input device 520 (e.g., a touch screen, mobile point of sale device, key pad, mouse and/or keyboard to enter content) and an output device 525 (e.g., a computer monitor, touch screen, key pad, mobile point of sale device to display a user interface element).

Financial inclusion processor 505 may communicate with a memory/storage device 530. Storage device 530 may comprise any appropriate information storage device, including combinations of magnetic storage devices (e.g., a hard disk drive), optical storage devices, and/or semiconductor memory devices. In some embodiments, storage device may comprise a database system.

Storage device 530 stores program code 535 and rules-driven claim processing logic 540 that may provide computer executable instructions for controlling the financial inclusion processor 505 (e.g., processing requests from, for example, client devices in accordance with processes herein). Financial inclusion processor 505 may perform the instructions of the programs 535/540 to thereby operate in accordance with any of the embodiments described herein. For example, the financial inclusion processor 505 may receive a transaction and then may apply the financial inclusion program 535 to effect the transaction in both the user and merchant accounts, and provide a receipt to each. Program code 535 may be stored in a compressed, uncompiled and/or encrypted format. Program code 535 may furthermore include other program elements, such as an operating system, a database management system, and/or device drivers used by the processor 505 to interface with, for example, peripheral devices. Storage device 530 may also include data 545. Data 545 may be used by the system 500 to execute operations related to the financial inclusion processes disclosed herein. Data 545 may be used by system 500, in some aspects, in performing the processes herein, such as processes 200. For example, a relational database table may be persisted or referenced by data 545 that includes a directory or other data structure containing records of tokens 104 registered with the financial inclusion service.

As used herein, information may be "received" by or "transmitted" to, for example: (i) the platform 500 from another device; or (ii) a software application or module within the platform 500 from another software application, module, or any other source.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the elements depicted in the block diagrams and/or described herein. The method steps can then be carried out using the distinct software modules and/or sub-modules of the system, as described above, executing on one or more hardware processors 505 (FIG. 5). Further, a computer program product can include a computer-readable storage medium with code adapted to be implemented to carry out one or more method steps described herein, including the provision of the system with the distinct software modules.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application.

Those in the art will appreciate that various adaptations and modifications of the above-described embodiments can be configured without departing from the scope and spirit of the claims. Therefore, it is to be understood that the claims may be practiced other than as specifically described herein.

What is claimed is:

1. An apparatus comprising:
a connector attachment including a housing, wherein the connector attachment is selectively connectable to a mobile device; and
a first token stored within the connector attachment, wherein the first token is operative to execute a transaction with a second token.

2. The apparatus of claim 1, wherein the housing includes a mobile plug.

3. The apparatus of claim 2, wherein the mobile plug is configured to be received in a port of the mobile device.

4. The apparatus of claim 1, wherein the housing includes a connector attachment jack.

5. The apparatus of claim 4, wherein the connector attachment jack is configured to receive a plug of a second connector attachment storing the second token.

6. The apparatus of claim 1, wherein the selective coupling of the connector attachment to the mobile device is via wireless communication.

7. The apparatus of claim 1, wherein the connector attachment is selectively coupled to a second connector attachment.

8. The apparatus of claim 7, wherein the first token and the second token are configured to execute the transaction when the connector attachment is selectively coupled to the second connector attachment.

9. The apparatus of claim 8, wherein the transaction is recorded by each of the first token and the second token.

10. The apparatus of claim 1, wherein the connector attachment includes a display panel.

11. The apparatus of claim 1, wherein the transaction includes a transfer of funds between the first token and the second token.

12. The apparatus of claim 11, wherein the funds represent funds on deposit.

13. A method comprising:
providing a first token stored within a first connector attachment;
connecting the first connector attachment to a first mobile device;
connecting the first connector attachment to a second connector attachment; and
executing a transaction between the first token and the second connector attachment.

14. The method of claim 13, wherein the second connector attachment includes a second token.

15. The method of claim 13, wherein connecting the first connector attachment to the first mobile device further comprises:
receiving a mobile plug of the first connector attachment in a port of the first mobile device.

16. The method of claim 13, wherein connecting the first connector attachment to the second connector attachment further comprises:
receiving a first connector plug of the first connector attachment in a connector attachment jack of the second connector attachment.

17. The method of claim 13, wherein connecting the first connector attachment to the second connector attachment is via wireless communication.

18. The method of claim 14, further comprising:
recording the transaction by each of the first token and the second token.

19. The method of claim 13, wherein the execution of the transaction is in real time.

20. The method of claim 13, further comprising:
storing funds on the first token prior to connection to the second connector attachment.

* * * * *